(12) United States Patent
Aroyan et al.

(10) Patent No.: US 8,890,852 B2
(45) Date of Patent: *Nov. 18, 2014

(54) ACOUSTIC TOUCH SIGNAL DISPERSION RESPONSE AND MINIMIZATION

(75) Inventors: James L. Aroyan, Santa Cruz, CA (US); Francis Lau, Fremont, CA (US); Joel C. Kent, Fremont, CA (US)

(73) Assignee: Elo Touch Solutions, Inc., Menlo Park, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 13/485,913

(22) Filed: May 31, 2012

(65) Prior Publication Data
US 2013/0147768 A1    Jun. 13, 2013

Related U.S. Application Data

(63) Continuation-in-part of application No. 13/323,631, filed on Dec. 12, 2011.

(51) Int. Cl.
*G06F 3/043* (2006.01)
(52) U.S. Cl.
USPC ........................................ 345/177; 178/18.04
(58) Field of Classification Search
CPC ...... G06F 3/043; G06F 3/0433; G06F 3/0436
USPC .................... 345/173–178; 178/18.01–20.04; 702/48, 103, 54
See application file for complete search history.

(56) References Cited

U.S. PATENT DOCUMENTS

| | | | |
|---|---|---|---|
| 4,644,100 A | 2/1987 | Brenner et al. | |
| 4,880,665 A | 11/1989 | Adler et al. | |
| RE33,151 E | 1/1990 | Adler | |
| 5,854,450 A * | 12/1998 | Kent | 178/18.04 |
| 6,366,277 B1 * | 4/2002 | Armstrong | 345/177 |
| 6,504,530 B1 | 1/2003 | Wilson et al. | |
| 2007/0109279 A1 | 5/2007 | Sigona | |
| 2008/0266266 A1 | 10/2008 | Kent et al. | |
| 2013/0147767 A1 | 6/2013 | Lau | |

OTHER PUBLICATIONS

Kino; "Acoustic Waves: Devices, Imaging, and Analog Signal Processing;" pp. 131-153; dated 1987; Preface and Table of Contents retrieved on May 9, 2014 from <http://www.ieee-uffc.org/publications/books/toc.asp?book=01>.
Office Action for U.S. Appl. No. 13/323,631; dated Apr. 4, 2014.

* cited by examiner

*Primary Examiner* — Joe H Cheng
*Assistant Examiner* — Hang Lin
(74) *Attorney, Agent, or Firm* — Alston & Bird LLP

(57) ABSTRACT

A touch input system includes a substrate configured to support propagation of acoustic signals, a transducer in communication with the substrate and configured to transmit or receive the acoustic signals before or after the propagation, and an array of reflectors disposed on the substrate. Each reflector is oriented on an angle to redirect the acoustic signals along a path toward or away from the transducer. The transducer includes a stepped interface for the redirected acoustic signals. The stepped interface includes a set of interface elements distributed across a width of the acoustic signals and offset from one another along the path to compensate for the angle of the reflectors.

20 Claims, 13 Drawing Sheets

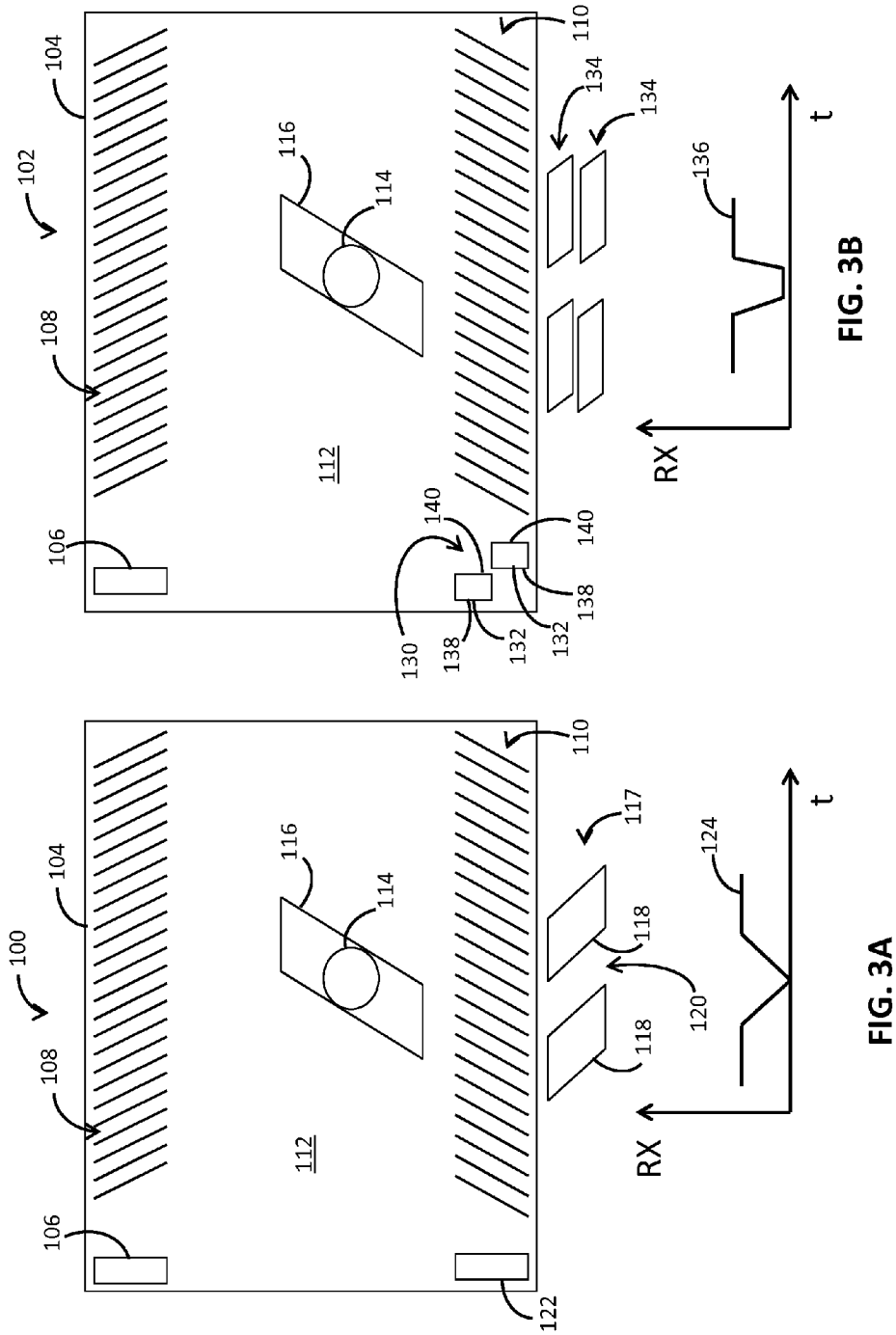

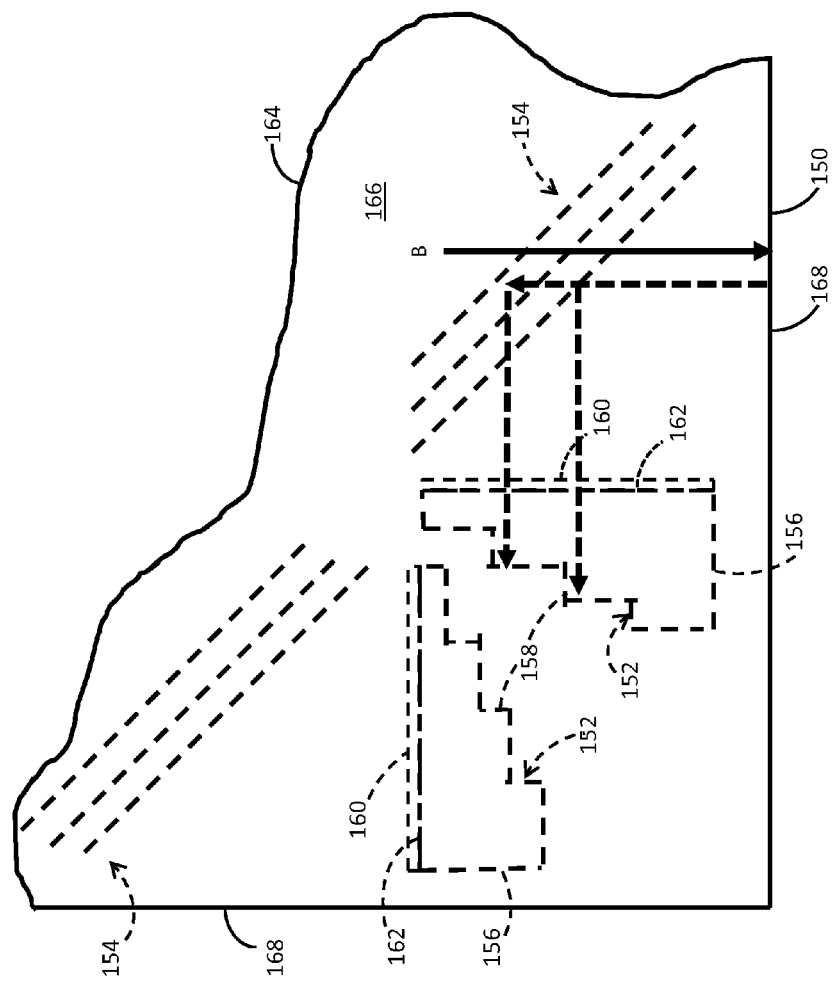

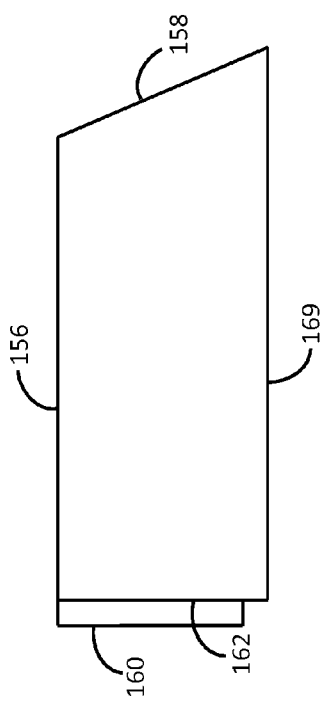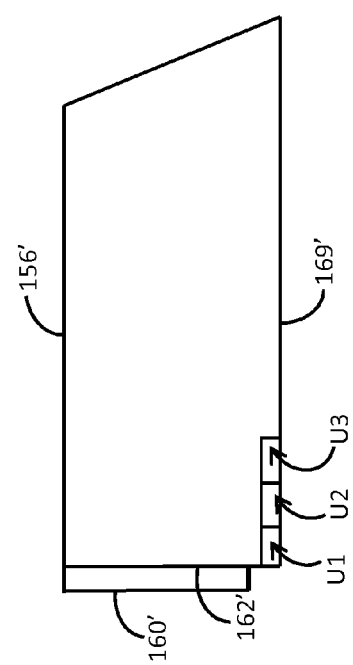

ACOUSTIC TOUCH SIGNAL DISPERSION RESPONSE AND MINIMIZATION

CROSS-REFERENCE TO RELATED APPLICATION

This application is a continuation-in-part, and claims the priority benefit under 35 U.S.C. §120, of the U.S. non-provisional application entitled "Dispersion-Based Acoustic Touch Signal Detection and Reflector-Based Dispersion Mitigation," filed Dec. 12, 2011, and assigned U.S. application Ser. No. 13/323,631, the entire disclosure of which is hereby incorporated by reference.

BACKGROUND

Touch input systems detect touch events, such as a touch from a user's finger, a stylus, or some other device. Touch regions of the touch input systems are often transparent for use with an information display of a computer or other electronic system. Other touch input systems are opaque touch sensors, such as touch or track pads. Touchscreens and other touch input systems are used in a variety of applications, such as information kiosks, retail points of sale, order entry systems (e.g., restaurants), industrial process control applications, interactive exhibits, mobile phones and other personal electronic devices, and video games.

Some touch input systems use acoustic signals to detect touch events. Certain types of acoustic touchscreens, also known as ultrasonic touchscreens, detect touch with high transparency and high resolution, while providing a durable touch surface. Of particular commercial interest are ultrasonic touchscreens using surface acoustic waves (SAW).

SAW touchscreens often have a glass overlay on which transmitting and receiving piezoelectric transducers are mounted. A controller sends an electrical signal to the transmitting transducer, which converts the signal into ultrasonic waves on the surface of the glass. These waves are directed across the touchscreen by an array of reflectors. Reflectors on the opposite side direct the waves to the receiving transducer, which reconverts the waves into an electrical signal. The process is repeated for each axis. A touch absorbs a portion of the waves traveling across the touch region on the surface. The received signals for X and Y are compared to stored digital maps, the change is recognized, and a coordinate is calculated from the center of the "shadow" or touch signal in the form of an attenuation dip in the received signal. For single touch operation, effects that spread out or disperse in time the touch signal are of only secondary importance as they have little effect on the touch coordinate extracted from touch signal centers.

Problems arise for many touchscreens when two or more touch events occur simultaneously. The multiple touches cause two or more X and two or more Y attenuation locations. When the separation between a pair of touches becomes small, such as at the end of a two-finger zoom-out or pinch gesture or at the beginning of a two-finger zoom-in gesture, the shadows or attenuation dips may blur together confounding touch coordinate data.

SUMMARY

In a first aspect, a touch input system includes a substrate configured to support propagation of acoustic signals, a transducer in communication with the substrate and configured to transmit or receive the acoustic signals before or after the propagation, and an array of reflectors disposed on the substrate, each reflector being oriented on an angle to redirect the acoustic signals along a path toward or away from the transducer. The transducer includes a stepped interface for the redirected acoustic signals, the stepped interface including a set of interface elements distributed across a width of the acoustic signals and offset from one another along the path to compensate for the angle of the reflectors.

In a second aspect, a transducer for a touch input system includes a mode conversion wedge including a first face and a second face opposite the first face, the mode conversion wedge being configured to convert surface acoustic wave (SAW) signals to bulk pressure waves, and a piezoelectric element disposed at the second face of the mode conversion wedge opposite of the first face to transmit or receive a reflection of the bulk pressure waves off the second face. The first face includes a plurality of reflector steps offset from one another to compensate for dispersion of the SAW signals.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the drawings are not necessarily to scale, emphasis instead being placed upon illustrating the principles of the invention. Moreover, in the drawings, like reference numerals designate corresponding parts throughout the different views.

FIGS. 3A and 3B are top view, schematic diagrams and associated graphical plots illustrating dispersion mitigation of acoustic signals after touch events using a stepped transducer topology configured in accordance with one embodiment.

FIG. 4 is a partial, top view, schematic diagram of another example embodiment of a stepped transducer topology mounted on a backside of a touchscreen or other touch input system substrate.

FIG. 6A is a side view of the stepped transducer of FIG. 5.

FIG. 6B is a side view of a stepped transducer according to another embodiment.

DETAILED DESCRIPTION OF SPECIFIC EMBODIMENTS

Figure 1:
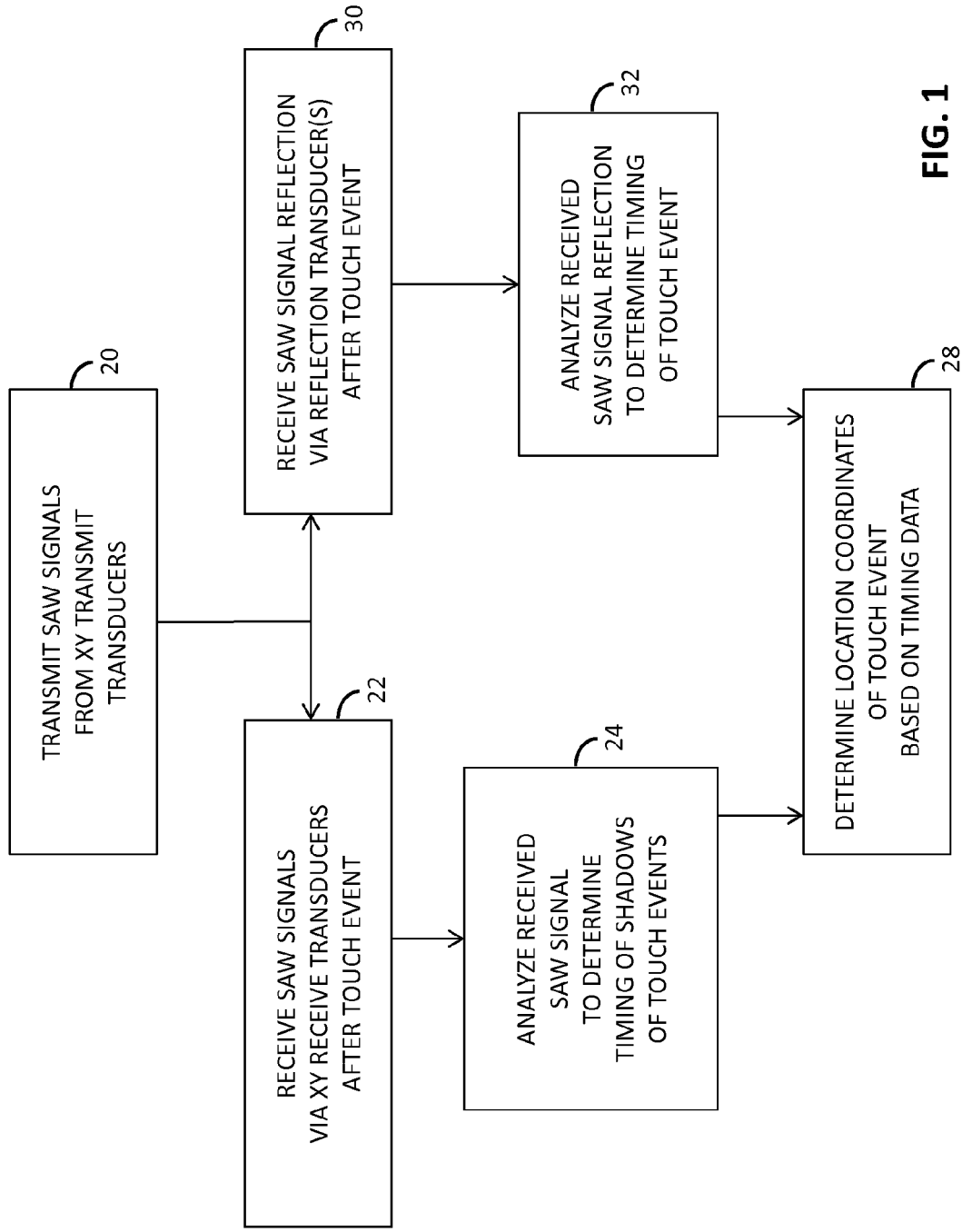
FIG. 1 is a flow diagram of an example embodiment of a method of determining a touch event location.

Systems, devices, and methods are configured for detecting touch events on an acoustic touchscreen or other acoustic touch input system. The disclosed systems, devices, and methods may be configured to minimize in touch signals the effects of time spreading or dispersion. The term "dispersion" may be used in connection with any effect resulting in undesired time spreading of signals, rather than only frequency dependence of phase velocity. The disclosed systems, devices, and methods may be configured to separate or distinguish between close pairs of touches by, for instance, sharpening touch shadows. The disclosed systems, devices, and methods may reduce dispersion or time spreading of signal delay time ranges corresponding to touches. One source of such dispersion arises from the effects of the finite width of arrays of angled reflectors. This source of dispersion may be mitigated via a stepped transducer topology of the disclosed systems.

The dispersion mitigation techniques are not limited to a specific transducer arrangement. In some cases, one or more touch position coordinates may be determined based on a reflection signal from the touch. The time of flight of the reflection signal may be used to determine a distance from the receiving transducer(s). The transducers detecting the reflection signals may be dedicated to detecting reflection signals or also used in other touch sensing functions, such as transmission or reception of other signals. One or more reflection transducers may be configured to transmit and/or receive acoustic waves in a radial fan.

The touch detection technique with dispersion mitigation may be used in conjunction with systems having sensing structures to support touch location detection for more than one axis. For example, a touchscreen system may include both X- and Y-axis sensing structures, and/or a U-axis sensing structure(s), each determining touch position coordinates for a respective axis based on time-of-flight or other timing information. A U-axis may correspond with a linear coordinate or axis tilted with respect to both the X- and Y-axes, such that a U coordinate corresponds with $U=aX+bY+c$, where a and b are non-zero.

The desirability of reduced touch signal dispersion is not limited to touch substrates or regions of any specific size. In some embodiments, the touch substrate or region may be sized or otherwise configured for a tablet, mobile phone or other personal or handheld device. In other embodiments, the touch substrate may be sized or otherwise configured for a desk-top sized touch computer or a large inter-digital signage application. The touch substrate or region may have one or more dimensions on the order of a few inches or less, or on the order of a meter or more. The dimensions of the touch substrate or region may vary based on a number of factors, including, for instance, the tolerance or other characteristics of the reflector arrays and other structures that may minimize distortion (e.g., interference and other noise) of the ray-like behavior of the acoustic signals.

The degree of dispersion of the acoustic signals may be reduced via a modified transducer topology. A transducer topology or interface that mitigates dispersion effects inherent to reflector array-based touch detection may be used.

The transducer topology may present a stepped transducer interface. The interface may include a stepped transducer structure or multiple transducer structures in a stepped arrangement. The stepped transducer topology allows a received acoustic signal to be less convoluted. The attenuation (hereinafter "dip") in the acoustic signal arising from a touch event may thus be sharper than with a non-stepped transducer topology. By increasing the clarity of the received acoustic signal, the stepped transducer topology may enhance the resolution of a touchscreen or other touch input system. The stepped transducer interface may vary the placement of the transducer, or a mode conversion wedge of the transducer, across the width of an incoming acoustic signal to be received. The varied placement of the transducer interface may match, compensate, or otherwise address the profile of the incoming acoustic signal, which is shaped by the reflector array that redirects the signal toward the transducer interface. The incoming acoustic signal may be oriented at a 45 degree angle relative to the transducer as a result of the 45 degree orientation of the reflector array in a specific embodiment. The varied placement of the transducer interface may lead to a parallel reception of components of the incoming acoustic signal. The varied placement of the transducer interface may involve multiple, discrete, spaced apart transducers of either wedge or grating type, or a single transducer with a stepped surface, e.g., a stepped mode conversion wedge. In embodiments having grating transducers, the steps may be as fine as the grating spacing.

Any of the examples of the stepped transducer topology described below may be used in a touch input system that determines touch position via time-of-flight analysis and/or via other techniques involving detecting the timing of an acoustic signal dip or other attenuation indicative of a touch event.

FIG. 1 is a flow diagram showing a method of detecting a touch event on a touchscreen or other touch input system. The touch detection method is based on the propagation and detection of acoustic signals through or on a substrate of the touchscreen or touch input system. The configuration of the substrate may vary. The acoustic signals may travel along a surface of the substrate as surface acoustic wave (SAW) signals. In act 20, one or more SAW signals are transmitted from one or more transducers in communication with the substrate. In one example, SAW signals are transmitted, either concurrently or alternately in various embodiments, from a pair of transducers, each transducer being part or one of the sensing structures for a respective axis. For instance, the SAW signals may be generated by X and Y transducers associated with an X axis and a Y axis perpendicular to the X axis, respectively. Respective arrays of transmit reflectors may be spaced along the axes to redirect the SAW signals across the substrate along perpendicular paths. For example, SAW signals transmitted by the X transducer are reflected by the transmit reflectors spaced along the X axis, resulting in the SAW signals propagating across the substrate along the Y axis. Similarly, SAW signals transmitted by the Y transducer are reflected by the transmit reflectors spaced along the Y axis, resulting in the SAW signals propagating across the substrate along the X axis. When a touch event occurs on the substrate surface, the touch interacts with the SAW signals at corresponding positions along the axes. The interaction causes attenuation of the SAW signal, which appears as a dip in a waveform profile of the SAW signal. After the touch event, receive reflectors spaced along opposite sides from the transmit reflectors may redirect the SAW signals toward one or more receive transducers, e.g., X and Y receive transducers. The SAW signals are then captured by the receive transducers in act 22. The receive transducers convert the SAW signals into electrical signals. Because different path lengths are provided for SAW signals, the received signals represent a waveform profile where different times correspond to different location along a given axis.

The position of the touch event may then be determined based on analysis of the received SAW signals in act 24. The position is specified by coordinates referencing the axes. In act 24, the received SAW signal is analyzed to determine the timing of the dip in the SAW signal waveform profile. For each received SAW signal, the timing of the dip in the signal may be used to determine the position (or coordinate) along the axis of the transmit and receive reflector arrays redirecting that SAW signal. The other axis coordinate may be determined by another SAW signal received by a different transducer.

The location of the touch event may be determined in act 28 based on the timing of touch-induced signal attenuation dips and, in some cases, reflection signals.

Practice of the disclosed method is not limited to a particular transducer configuration. The transmit and receive transducers described herein may vary in construction and other characteristics. For example, one or more of the transmit and receive transducers may be a wedge transducer, and include a mode conversion wedge constructed of, for instance, acrylic glass (e.g., the thermoplastic material commercially available as PLEXIGLAS™, LUCITE® or ACRYPET®). A piezoelectric element of the wedge transducer generates acoustic waves, such as bulk pressure waves, in the wedge. The piezoelectric element may be constructed of a ceramic material such as lead zirconate titanate (PZT). At the boundary of the wedge with the glass substrate of the touch surface, surface acoustic waves are generated. Alternatively or additionally, one or more of the transmit and receive transducers may be a grating transducer. The method may include one or more SAW signals being transmitted, received, or captured by one or more radial transducers mounted in, for instance, a corner of the touchscreen. Alternatively or additionally, one or more of the receive transducers may capture the SAW signals via a stepped interface configured to mitigate reflective array-based dispersion of the acoustic signal, as described below.

The example method of FIG. 1 may also include the transmission and/or reception of one or more reflective SAW signals. Energy from one or more transmitted SAW signals may be reflected as a result of interaction of the SAW signal with the touch, and eventually captured by one or more receive transducers. The SAW signals may be transmitted to cause the reflection(s), or the reflections may be generated as an incidental consequence of the SAW signals transmitted in act 20. Thus, the reflective signals may be generated from SAW signals dedicated to causing the reflections, or from the SAW signals used for dip detection. Thus, the transducers transmitting the SAW signals intended for reflection-based reception may, but need not, be in addition to the transmit transducers involved in act 20.

The reflective SAW signals are received in act 30 after the touch event. In this example, the reflective SAW signals are detected by one or more reflection transducers configured to receive the reflections. The reflection transducer(s) may correspond with the transducer(s) used to transmit the SAW signals causing the reflection(s). The reflective acoustic signal may be captured via any one of the transmit transducers in acoustic communication with the touchscreen, each such transducer being switched to a receive mode after the SAW signal is transmitted. The transducers may be switched between transmit and receive modes by the touch controller. Alternatively or additionally, one or more of the receive transducers used to receive the attenuated SAW signals for the axes may be used to receive the reflective SAW signals. Such reception may thus involve redirection via one or more of the reflective arrays.

In some embodiments, the reflection signals are transmitted and/or received via radial transducers. Once the time of flight is determined, the distance from the transducer(s) may be resolved. Because the reflection signal may be a bit convoluted (e.g., the center of the touch is not very well defined), a signal smoothing operation may be implemented. The received radial reflection signal may be noisy due to gain provided after reception. The noise may arise from an amplifier, such as a low-noise amplifier (LNA), and/or resulting from parasitic reflections from a transmit transducer (e.g., when using the same transducer to transmit and receive). Another source of parasitic noise may include reflection off an edge of the touchscreen. Touch location detection based on reflection signals may alternatively or additionally use a sweeping method, such as a phased array technique.

After the reflection or other transducer(s) receives the reflective SAW signal, the touch controller analyzes in act 32 the reflection data to determine a timing of the touch event. The analysis may include a determination of the travel time of the reflective SAW signal. Using a known or estimated speed of propagation and the known transmission source location, the time indicates a distance between the transducer and a position at which the reflection occurred. One or more position coordinates may then be determined in act 28 based on the travel or arrival time of the reflective acoustic signal, in combination with other information gathered from other acoustic signals. Alternatively or additionally, the arrival time of the reflective SAW signal may be used to resolve ambiguities arising from dual- or other multiple-touch scenarios.

The SAW signals causing the reflections may differ from those involved in the attenuation level analyses. The reflection analysis may benefit from a longer SAW signal than a single cycle transmission. For example, the transmitted SAW signal may include a plurality of cycles. The plurality of cycles may lead to a pulse duration greater than or about equal to the width of the reflector arrays. Such increased signal length may be useful to ensure that sufficient energy is captured by the receive transducer. The reflection signal may receive the time of flight information using a single large pulse. However, due to the attenuation of SAW signals, more than a single large pulse may be used to distinguish the signal from noise. Alternatively or additionally, a chirp transmit signal may be used in reflection-based SAW detection.

The configuration of the transducers used to receive the reflective SAW signals may vary. In one example, the reflective signals are captured via a radial transducer. Alternatively or additionally, the reflective signals are captured by one or more of the transducers mounted and otherwise configured to capture the SAW signals for a respective axis.

Practice of the disclosed methods is not limited to those touch input systems transmitting signals for reflection analysis or those otherwise receiving reflective signals to determine touch location.

Figure 2:
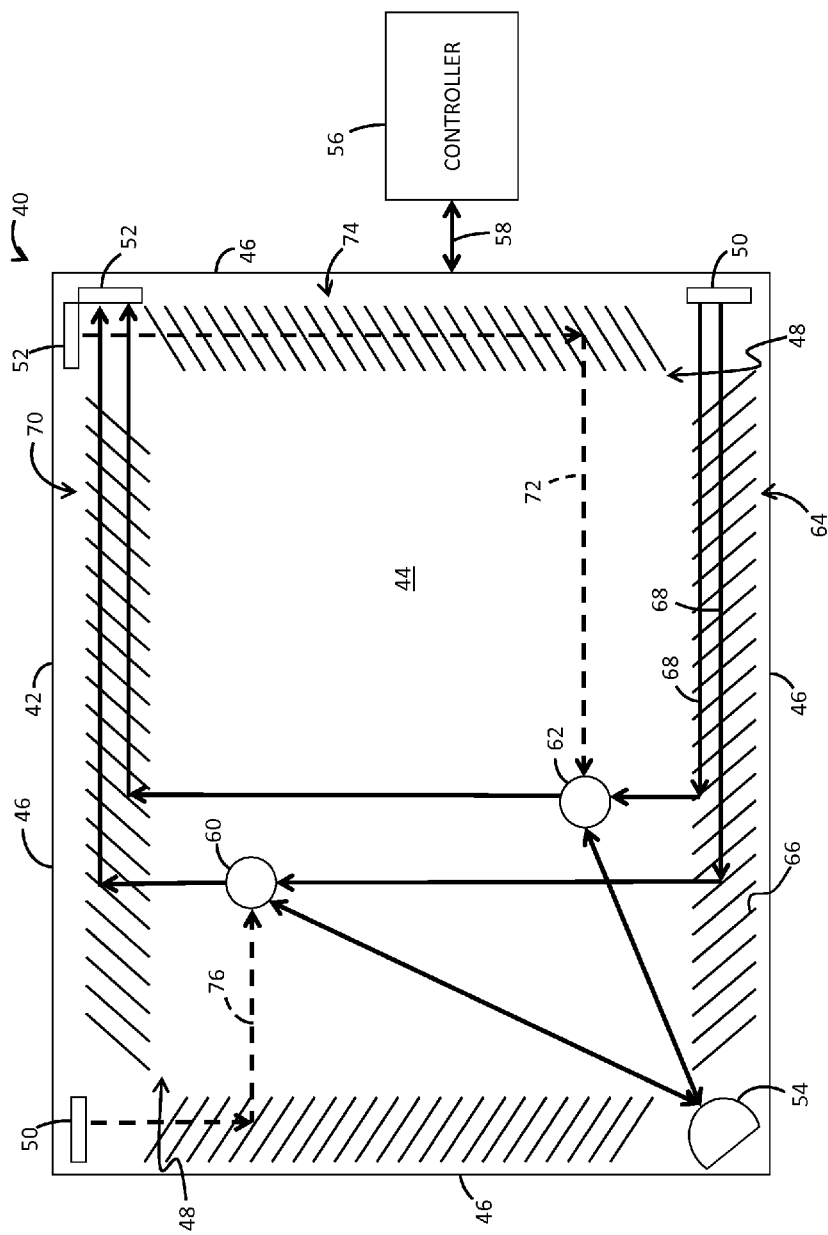
FIG. 2 is a top view, schematic diagram of an example embodiment of a touch input system with touch detection according to one embodiment.

FIG. 2 is a schematic, top view of a touch input system 40 configured to implement one or more of the above-described touch detection methods and techniques. The touch input system 40 includes a substrate 42 configured to support propagation of an acoustic signal, such as a SAW signal, across the substrate 42. The substrate 42 may be a display screen or an overlay disposed upon the display screen. For example, the substrate 42 may include a glass display overlay through or on which the SAW signals travel. The substrate 42 includes a touch-sensitive area or region 44 having two or more axes. The touch area 44 may correspond with a viewable area of a display in an assembled device, and may also extend beyond the viewable area. In this example, the touch area 44 is defined by a Cartesian coordinate system via two orthogonal axes X and Y. The touch area 44 may be defined by polar and other coordinate systems in other embodiments.

The touch input system 40 includes an arrangement of transducers disposed along one or more side edges 46 of the substrate 42 or adjacent to the region 44. The side edges 46 and the transducer arrangement define an outer border or periphery 48 of the touch area 44. The outer border 48 and, thus, the touch area 44 may also be generally defined by a bezel (not shown) or other cover protecting the transducers and other components of the touch input system 40 in some embodiments. Each transducer is mounted on or otherwise disposed in communication with the substrate 42 in a position proximate one or more of the edges 46. The touch input system 40 may include transmit transducers 50 to produce the acoustic signals, and receive transducers 52 to receive the acoustic signals after propagation across the substrate 42 to generate an electrical waveform representation of the received acoustic signal. Alternatively or additionally, the touch input system 40 may include one or more transducers directed to both transmission and reception. In this example, the touch input system includes a radial transducer 54, which both produces and captures acoustic signals.

The number and type of axes having sensing structures may vary, including those embodiments in which the touch input system 40 provides touch position coordinates for multiple axes (e.g., X and Y) based on sensing structures disposed along a single axis. In this example, the touch input system 40 includes respective sensing structures for three axes, two Cartesian axes and one non-Cartesian (e.g., radial) axis. Respective transmit transducers 50 are provided for each axis of the touch input system 40 in respective corners of the touch area 44. Respective receive transducers 52 are provided for the Cartesian axes of the touch input system 40. The receive transducers 52 need not be disposed in a common corner of the touch area 44, as in the example shown. The number, arrangement, and configuration of the transmit and receive transducers 50, 52 for the Cartesian axes may vary from the example shown. The radial transducer 54 in this example is disposed in a corner of the touch area 44 opposite the receive transducers 52. The radial axis need not rely on a transducer operating in both transmit and receive modes, and the radial transducer 54 need not be disposed in a corner of the touch area 44. The touch input system 40 need not include a radial or other non-Cartesian axis, and may include more than one radial transducer in other embodiments.

The touch input system 40 includes a controller 56 configured to direct the operation of the transducers 50, 52, 54. The controller 56 may be coupled to or connected with the transducers 50, 52, 54 via cabling 58 for communication of the electrical signals driving or generated by the transducers. The controller 56, which may be an application specific integrated circuit, may be programmed or otherwise configured to implement the above-described methods and techniques described herein to detect a touch event occurring during the transmission of the acoustic signals. The integrated circuit chip commercially available from Texas Instruments, Inc. under model number THS4131 may be configured for use as an analog front end to the touch controller 56. The controller 56 need not be disposed on a single chip, and may include any number of processors or processing units in communication with a chip or other circuitry directed to handling the electrical signals generated by or delivered to the transducers.

The controller 56 is configured to analyze the waveforms generated by the transducer arrangement to detect one or more touch events at touch locations 60, 62 occurring during the transmission of the acoustic signals. The analysis may include determining the timing of a dip(s) in one of the waveform representations of the received acoustic signals. The controller 56 may then generate a coordinate of the touch location 60, 62 based on the timing of the dip, the coordinate referencing one of the axes of the touch area 44.

The touch input system 40 may rely upon signals from sensing structures for one or more of the three axes to determine each location coordinate of the touch locations 60, 62. A combination involving more than one of the axes may be used by the controller 56 to resolve ambiguities arising from, for instance, the touch events at the locations 60, 62 occurring simultaneously. Signals from sensing structures for more than one axis may be used by the controller 56 to determine a location coordinate to refine or otherwise adjust the data determined by the sensing structures for one of the axes. One example operation is shown in FIG. 2 for determining both the X and Y coordinates from transmit and receive transducers 50, 52 for the X axis. The transmit transducer 50 in the lower right-hand corner of the substrate 42 produces a SAW signal that travels along a frit or other array 64 of reflectors 66, each reflector 66 being oriented on an angle (e.g., 45 degrees) to redirect a portion of the SAW signal along a path across the touch area 44. Each reflector 66 of the array 64 may be constructed of glass frit (or other inorganic sintered ceramic material) disposed on the substrate 42. However, the reflector spacing, construction, mounting, material, configuration, and other characteristics of the array 64 may vary from the example shown. The SAW signal for the X axis is depicted schematically as a number of rays 68 that are eventually reflected by the array 64 for interaction with the touch events at the locations 60, 62, where the attenuation of the SAW signal occurs. Example rays are provided, but other SAW signals exist on the touch area 44. The SAW signal passes through the touch locations 60, 62 and reaches another reflector array 70 disposed along the side edge 46 opposite the side edge 46 having the array 64. The reflectors of the array 70 redirect the SAW signal toward the receive transducer 52 of the X axis, at which the energy of the SAW signal is received and converted into an electrical waveform having dips indicative of the touch locations 60, 62.

Each dip may then be analyzed by the controller 56 to determine the X coordinates of each touch location 60, 62. Based on the timing of the dips, the X coordinate locations of the two touch locations 60, 62 may be determined. A similar analysis of the timing of waveform dips may be implemented for the Y axis using the other transmit and receive transducers 50, 52. However, there are two X coordinates and two Y coordinates, providing four possible locations. There may be ambiguity as to which X coordinate to associate with which Y coordinate when the two touch events at the locations 60, 62 occur at a same time. Each of the coordinates determined via the dip timing analysis may be confirmed, refined, or otherwise further determined via analysis of one or more reflective signals.

The example shown in FIG. 2 also depicts several optional techniques for using reflective signal analysis to determine, or assist in determining, the location of the touch events 60, 62. The location of a touch event may be determined using one or more reflected acoustic signals. Each touch event creates reflected waves that may be detected by one or more of the transducers 50, 52, 54 on the substrate 42. In the depicted example, the receive transducer 52 for the Y axis may also operate as a transmit transducer emitting a SAW signal which is scattered by the reflector array 74 and has an acoustic path indicated schematically at 72, which travels to the touch location 62. After reflection from the touch at the touch location 62, the reflected SAW signal then returns to the other receive transducer 52 via the reflector array 70 of the X axis, as indicated by the solid arrows shown in FIG. 2. The controller 56 may use the arrival time of the reflective SAW signal 72 from the acoustic path 72 to determine a diagonal coordinate of the touch location 62 that corresponds with the X and Y coordinates within an offset and scaling factor.

Additional or alternative coordinate measurements may be obtained from one or more additional or alternative reflected touch signals. In one example, the transmit transducer 50 for the Y axis may be used to emit a signal indicated schematically at 76 and arriving at the touch location 60. The reflection of the signal 76 off of the touch at the touch location 60 results in an acoustic path scattered by the reflective array 70 and ending at the receive transducer 52, as shown by the solid arrows. This reflected signal provides a second mechanism to measure Y coordinates of touch locations.

The radial transducer 54 may also be used to capture signals reflected from the touch events at the locations 60, 62. The reflective signals may be created by a reflection of a signal generated by one of the transmit transducers 50 for the X and Y axes, or be created by a reflection of a signal generated by the radial transducer 54. Either way, the arrival time of the reflective signal may be used by the controller 56 to refine or otherwise determine one or both of the X and Y coordinates of the touch locations 60, 62. Reflections from radial signals may be useful because the radial transducer 54 is positioned to capture the energy reflected 180 degrees from the object touching the surface 42. A detectable fraction of the reflected energy is directed 180 degrees from the direction of the transmitted signal. In the example shown, the radial transducer 54 is directed to generate a number of radial SAW signals and then switch to a receive mode to capture the reflections. The controller 56 may then use the respective time-of-flights of the reflections as an indication of the corresponding distances between the radial transducer 54 and the touch locations 60, 62. Ambiguities as to which of the two X coordinates and which of the two Y coordinates should be combined to provide (X, Y) coordinates of the touch locations 60, 62 may be resolved by having reconstructed (X, Y) coordinates lie on an arc at the distance from the radial transducer 54 corresponding to a reflection detected by the radial transducer 54.

One or more of the receive transducers 52 may be configured with a stepped transducer interface. Each receive transducer 52 may include a mode conversion wedge to convert the bulk pressure waves created by a piezoelectric element into the SAW signal traveling through the substrate 42. As described below in connection with FIGS. 3B and 4, the stepped transducer interface may be formed via the piezoelectric element (FIG. 3B) or the mode conversion wedge (FIG. 4). In the former case, the piezoelectric element includes a plurality of piezoelectric structures offset from one another; while in the latter case the mode conversion wedge has a stepped face to vary the distance traveled in the wedge before the piezoelectric element is reached. In either case, the stepped interface of the receive transducer 52 may help clarify and sharpen the dip by compensating for the spreading of the SAW signal arising from the reflective array that directs the SAW signal to the receive transducer 52. Thus, the dispersion created by the array may be mitigated.

The acoustic energy may be dispersed, and the corresponding waveform profiles of the acoustic signals may be distorted. The touch input system (or touch controller or processor thereof) may include one or more low-noise circuit components to minimize the introduction of noise after the acoustic energy is captured. For example, the touch input system may include one or more low-noise amplifiers (LNA), such as the fully differential amplifiers commercially available from Texas Instruments under model number THS4131.

Distortion may also occur before the acoustic energy is captured by the receive transducers as a result of the dispersion or pulse signal spreading arising from the angled orientation of the reflector arrays. Such array-based dispersion may be addressed by the use of stepped transmit and receive transducers, as described below.

FIGS. 3A and 3B illustrate the array-based dispersion of the acoustic signals, as well as the mitigation thereof, in a pair of touch input systems 100 (FIG. 3A) and 102 (FIG. 3B). FIGS. 3A and 3B are top view, schematic diagrams and associated graphical plots illustrating dispersion after touch events. The diagrams and plots may depict a ray tracing approximation of the acoustic signals. The approximation may be useful in a variety of cases, including, for instance, those in which the arrays are within the near field of the transducers. FIG. 3B depicts partial mitigation of the dispersion of the acoustic signals using a receive stepped transducer topology configured in accordance with one embodiment. Additional mitigation of the dispersion of the acoustic signals may be achieved by replacing the standard transmit transducer 106 of FIG. 3B with a transmit stepped transducer. This configuration is not shown as the principles of stepped wedge transducers are illustrated using the configuration shown in FIG. 3B. Each touch input system 100, 102 may have a similar touch substrate 104 configured to support transmission of acoustic signals, such as SAW signals, one or more transmit transducers 106 on the substrate 104, and transmit and receive arrays 108, 110 of reflectors disposed on the substrate 104. Each reflector in the arrays 108 is oriented on an angle to redirect the acoustic signals along paths across a touch area 112. The energy of the acoustic signal is altered by a touch event at a location 114. The region of scattered energy is distributed over a slanted pulse envelope 116 after reflection by the transmit array 108. A portion close to the location 114 of the slanted pulse envelope 116 is shown in FIGS. 3A and 3B. The complete slanted pulse envelope 116 may extend all the way from the transmit array 108 and the receive array 110. Because the acoustic signal is redirected by different parts of each reflector in the array 108 at different times, an artifact is created. Assuming the acoustic signal reaches a given angled reflector at a certain time but due to the width of the signal, a portion of the acoustic signal is reflected before another portion. The total effect of a multitude of array elements (e.g., frits) results in the slanted pulse envelope 116. After a dip is created in the pulse envelope via the interaction with the touch at the location 114, the pulse envelope is reflected by the array 110.

As shown in FIG. 3A, the angled orientation of the reflectors in the array 110 creates an acoustic signal distribution 117 with pulse fronts 118 oriented at a corresponding angle (e.g., 45 degrees). A gap 120 in the acoustic energy remains representative of the touch location 114, but the angled pulse fronts 118 result in varying arrival times at a receive transducer 122. The variance in the arrival times, in turn, causes a waveform profile 124 with energy distributed throughout the dip. In one example in which the touch at the location 114 has a width roughly equal to the width of the reflector array, e.g., 16 wavelengths, then the width of the dip may be approximately 32 wavelengths, and the waveform profile 124 is V-shaped with zero width at the lowest, most detectable, level. In some cases, having a wider touch width may not be a problem because the center of the dip can be resolved. A challenge may arise when two touches are in close proximity. In this case, the touches with a wider width may tend to blend together, render the signal difficult to resolve. Additionally, the examples presented show an ideal touch at the touch location 114, where the touch location 114 completely attenuates the SAW signal travelling through. In non-ideal examples, the touch attenuation may follow a gradual profile with the center of the touch having the most attenuation and the edge of the touch having the least attenuation.

The example embodiment shown in FIG. 3B includes a receive transducer 130 with a stepped interface configured to reduce the effects of the angled pulse fronts. The stepped interface includes a set of interface elements 132 distributed across a width of the acoustic signal redirected by the array 110. The interface elements 132 are offset from one another in one or more steps along the path traveled by the acoustic signal. The interface elements 132 may be offset by an amount that compensates for the angled orientation of the reflectors in the array 110 (e.g., 45 degrees). In this example, the transducer 130 includes two interface elements, such that each may have a width corresponding to half of the width of the incoming acoustic signal or about half the width of the acoustic signal to be received. The "about" may account for some of the acoustic signal dispersing or manufacturing tolerances resulting in spread of the redirected signal. With two offset interface elements 132, the single acoustic signal distribution 117 of FIG. 3A is effectively transformed into two signal distributions 134 as shown in FIG. 3B. Each signal distribution 134 still has angled pulse fronts that decrease the width of the dip, but the offset of the interface elements 132 causes the signal distributions 134 to be effectively in parallel as shown. The signal distributions 134 arrive at the respective interface elements 132 at the same time, and the gaps in the signal distributions 134 may become aligned, which reduces the degradation of a waveform profile 136 generated by the transducer 130. The alignment of the gaps in the signal distributions 134 improves the effective width of the dip in the waveform profile 136. The overall width of the waveform profile 124 may be 32 wavelengths of the SAW signal with a single point of zero energy, while the waveform profile 136 may have a width of 24 wavelengths, with roughly 8 wavelengths of zero energy as a result of the pulse front compensation. The dip in the waveform profile 136 thus becomes more steep, rendering the dip more detectable. The transducer 130 may have more than two interface elements, with the slope of the walls of the dip increasing with the number of interface elements accordingly. For example, a stepped transducer with four stepped interface elements may provide a dip with a low level width of 20 wavelengths for an overall dip width of 12 wavelengths.

In the embodiment shown in FIG. 3B, each interface element 132 of the receive transducer 130 includes a respective piezoelectric element. The interface or piezoelectric element 132 may be mounted upon or otherwise disposed along a rear face 138 of a mode conversion wedge 140. Each interface element 132 is discretely formed by a respective structural assembly of piezoelectric and mode conversion components. The offset distance between the interface or piezoelectric elements 132 may, but need not, be set such that the elements 132 are positioned along an angle equal to the angle of the reflector array. Alternatively, the offset distance between the interface or piezoelectric elements may be adjusted via the thickness of the mode conversion wedge 140. The distance traveled by the acoustic energy through the mode conversion wedge 140 may be alternatively or additionally used to adjust the respective arrival times.

Figure 3D:
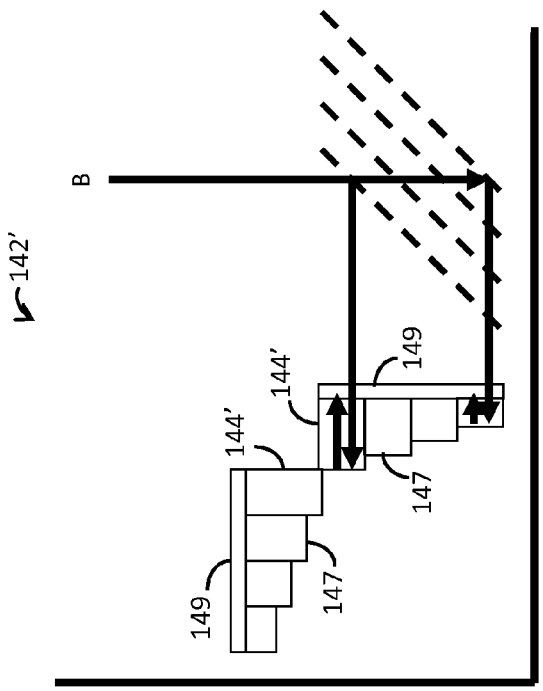
FIGS. 3C and 3D are top view, schematic diagrams of transducers configured with a stepped interface in accordance with further embodiments.
Figure 3C:
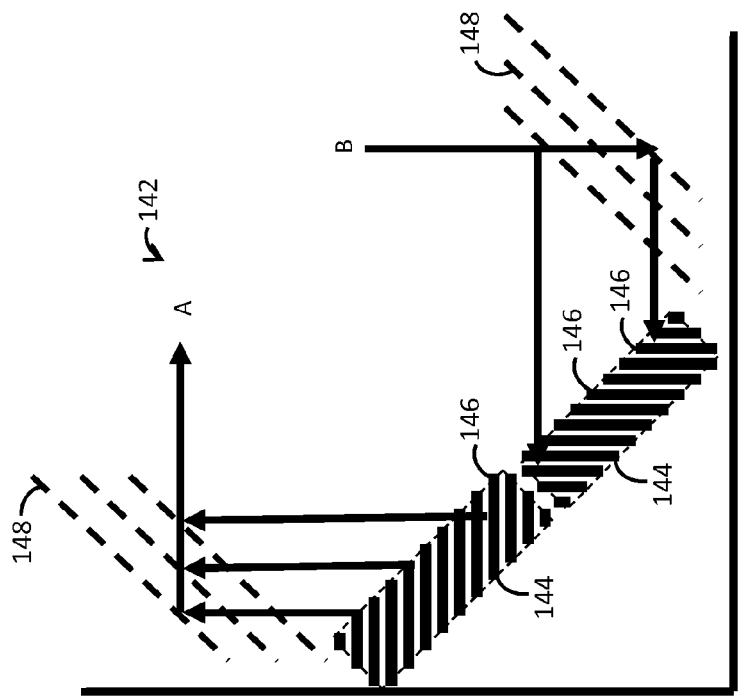

FIG. 3C depicts a touch input system 142 having a number of grating transducers 144 configured in accordance with another embodiment. A corner of the system 142 is shown with a pair of the grating transducers 144. Additional transducers 144 may be disposed in other corners of the system 142. Each grating transducer 144 has a stepped interface to reduce dispersion. In this example, each grating transducer 144 includes a set of transducer elements or grates 146 distributed across the width of the signal for which dispersion is to be reduced. Each transducer grate 146 is offset from adjacent transducer elements 146 to compensate for the angle at which reflector arrays 148 are disposed. In this example, the offsets between adjacent transducer grates 146 are embodied in offset ends of each grate 146 as shown. The grates 146 are oriented perpendicular to the desired SAW transmission or reception direction. Adjacent grates 146 may be separated from one another by a distance of one SAW wavelength.

The stepped nature of the grating transducers 144 may reduce signal dispersion due to array width effects in either a transmit or receive mode. One of the grating transducers 144 is illustrated in transmit mode, in which three rays leaving the transducer 144 and scattered by the reflector array 148 all have the same path length and thus delay time to reach point A in a touch area. The other grating transducer 144 is illustrated in a receive mode in which a pair of acoustic paths have the same path length and thus delay time from a touch area point B.

The system 142 may include a respective piezoelectric element (not shown) for each grating transducer. Each piezoelectric element may be bonded to an under surface of the substrate. The plan view locations of rectangular piezoelectric elements under the gratings 146 are indicated by the dashed rectangles in FIG. 3C. As shown, the piezoelectric elements are rotated by 45 degrees relative to the substrate edges and the acoustic signal paths.

FIG. 3D depicts an alternative touch input system 142' having a number of transducers 144' configured in accordance with yet another embodiment. Each transducer 144' has a stepped interface, as in the examples described above. In this embodiment, each transducer 144' includes a stepped wedge 147 instead of a set of grates to reduce signal dispersion. The acoustic propagation delay from a touch area point B to a piezoelectric element 149 is the same for the pair of paths depicted. More details regarding further examples of such stepped wedge transducers are provided below.

FIG. 4 is a schematic, partial top view of another example of a touchscreen or other touch input system 150 having receive transducers with a number of stepped transducer interfaces 152 to compensate for the angled pulse fronts arriving via reflector arrays 154. The example of FIG. 4 may be similar to the above-described stepped wedge example except that the transducer elements 152 and other components of the touch system 150 are disposed on the opposite side of the substrate as touch surface. In this case, a touch at point B of the touch area may propagate downward to a rounded glass edge before continuing upward on the other side as shown. The acoustic delay from the touch area point B to the piezoelectric element may be equal for the two paths shown.

The touch input system 150 of this embodiment may be configured for use in a zero-bezel touchscreen. The transducer elements and interfaces of the touch input system 150 may be disposed on a back side of the substrate 164 to remove the need for a protective bezel or cover on a front side 166 of the substrate 164 opposite the back side. Touch events occur on the front side 166, thereby creating dips in the acoustic signals, which are transmitted by the transmit arrays and transducers on the backside to wrap around rounded edges 168 of the substrate and travel across the substrate front side and wrap around an opposite rounded edge 168 to reach the back side where the energy is reflected by the arrays 154 and captured by the stepped transducers. The travel path of the acoustic energy may then proceed as if the receive transducer elements are disposed on the front side 166 of the substrate 164, including mode conversion within the mode conversion wedge 156, reflection off the reflector steps formed by the transducer interfaces 152, and reception by the piezoelectric element 160.

As in the above-described stepped wedge embodiment, the transducer interfaces 152 for a respective axis are provided via a single transducer assembly having a mode conversion wedge 156 with a stepped face 158. Each transducer assembly has a single piezoelectric element 160. Two such transducer assemblies are shown in FIG. 4, one for each axis.

The transducer interfaces 152 defined by each stepped face 158 may be distributed across the width of the incoming acoustic signal. The transducer interfaces 152 are offset from one another along the path of the signal to equalize the arrival time of the acoustic energy at the piezoelectric element 160. Each interface 162 may be directed to addressing a portion of the acoustic signal redirected by the reflector array 154. Each such portion of the acoustic signal may then be captured by the piezoelectric element 160 simultaneously, as described above in connection with the embodiment of FIG. 3B.

As with each of the transducers described above, the mode conversion wedge 156 is configured to convert between SAW signals and bulk pressure waves in the mode conversion wedge 156. The mode conversion wedge 156 may be constructed from an acrylic block molded or machined to form the stepped face 158. The bulk pressure waves are emitted from or received by the single piezoelectric element 160 (e.g., a strip) mounted on or otherwise disposed at a face 162 of the wedge 156 opposite the stepped face 158. The acrylic block may be composed of acrylic commercially available as Mitsubishi Acrypet VH001.

The transducer interfaces 152 for respective axes of the touch input system 150 need not be disposed alongside one another, or in the same corner.

Further details regarding the positioning and configuration of the stepped faces of the interface in stepped wedge embodiments are provided below in connection with FIGS. 8-11.

The stepped faces 158 of each transducer interface 152 may be configured as reflector steps. As shown in FIG. 4, each receive transducer is oriented relative to the reflector arrays 154 such that the face 162 (i.e., the face on which the piezoelectric element 160 is mounted) is a front face of the transducer assembly. The SAW signals travel under and past the front face 162 and the piezoelectric element 160 before undergoing mode conversion to bulk pressure waves within the mode conversion wedge 156. This orientation positions the stepped face 158 behind the front face 162, at the back of the receive transducer, for reflection of the bulk pressure waves. The reflection of the bulk pressure waves off the stepped faces 158 redirects the bulk pressure waves within the mode conversion wedge 156 toward the piezoelectric element 160.

In some cases (see, e.g., FIGS. 6B and 7), the offset may differ from the example of FIG. 3B to compensate for the decreased velocity of bulk waves in the wedge 156 and the doubling back of the acoustic path due to the reflection at stepped faces 158. The adjacent reflector steps, and corresponding undercut steps as described in connection with FIG. 7, may be spaced from one another based on a bulk wave speed in the acrylic block and geometrical and acoustic principles presented in FIGS. 8-11 and described in detail below. The speed of sound in the bulk of the mode conversion wedge 156 (e.g., acrylic glass) is slower than the speed of the surface acoustic wave in a substrate 164 of the touch input system 150 through which the acoustic energy travels. For example, bulk waves in acrylic may travel at 2680 m/s, while the SAW waves may travel in glass at 3160 m/s. Despite these different wave propagation speeds, the acoustic energy may still be made to arrive in parallel at the single piezoelectric element 160 through the variation in adjacent step spacing.

The number of stepped faces need not be four as shown. The number of faces may be adjusted in accordance with the amount of compensation provided for the reflector angle. Thus, the number of steps or faces per wavelength of the surface acoustic waves may vary.

Figure 5:
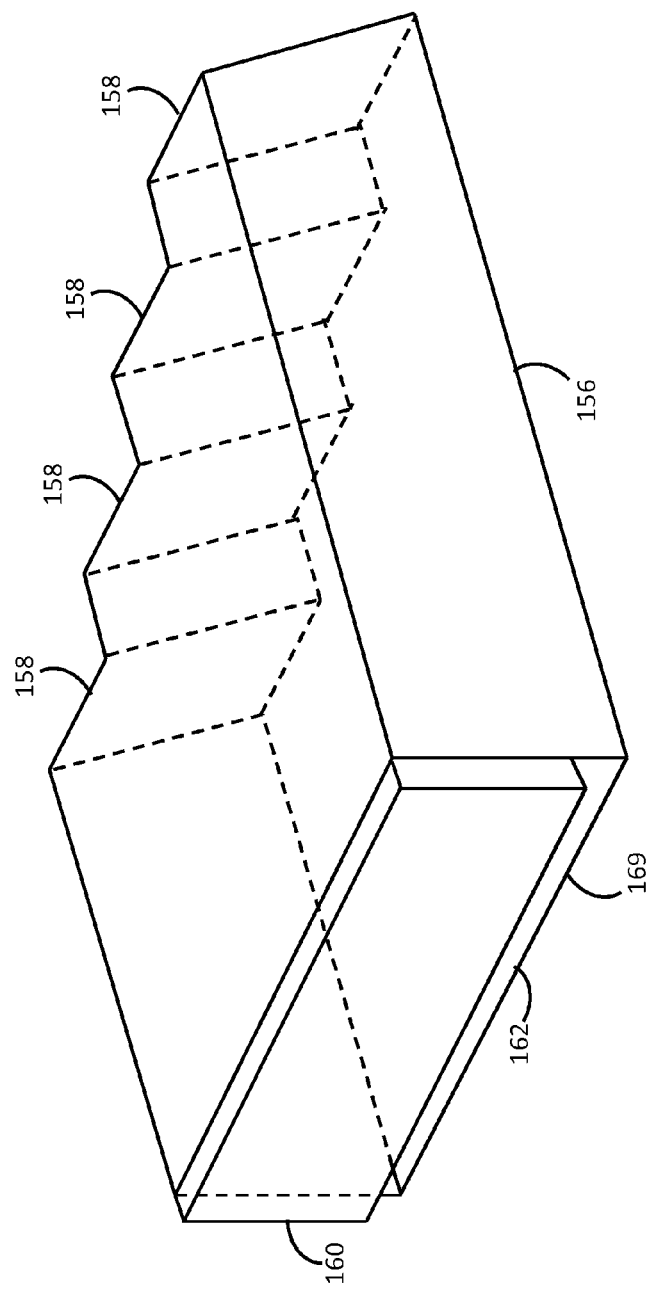
FIG. 5 is a perspective view of a stepped transducer of the stepped transducer topology shown in FIG. 4 in accordance with one embodiment.

As shown in FIGS. 5 and 6A, the piezoelectric element 160 may be spaced from a bottom 169 of the mode conversion wedge 156. The piezoelectric element 160 is thus also spaced from the bottom of the substrate 164 (FIG. 4). The spacing between the piezoelectric element 160 and the bottom 169 of the mode conversion wedge 156 (and/or the substrate 164) allows the SAW signals to pass by the piezoelectric element 160. The piezoelectric element 160 thus does not interfere with, or otherwise adversely affect, the SAW signals before the SAW signals are converted into the bulk pressure waves. The spacing between the piezoelectric element 160 and the bottom 169 of the mode conversion wedge may also allow for some manufacturing tolerance in the placement of the piezoelectric element 160 without fear of mechanical interference between the piezoelectric element 160 and the substrate 164. The spacing may avoid attenuation or signal corruption in the piezoelectric element 160, and allow the SAW energy to convert into bulk pressure waves for reflection in the mode conversion wedge 156 back toward the piezoelectric element 160.

FIGS. 5 and 6A also depict the reflector steps formed by the stepped faces 158 of the mode conversion wedge 156. The stepped faces 158 may be oriented at an angle, thereby forming the wedge shape of the mode conversion wedge 156. The angle or slope of the stepped faces 158 may be determined in accordance with one or more of the following design principles: (i) the reflection law that the angle of reflection equals the angle of incidence (assuming no mode conversion); and (ii) Snell's law that the sine of the refracted angle divided by the transmitted wave phase velocity equals the sine of the incident angle divided by incident wave phase velocity. For instance, Snell's condition that $\sin(90°-\theta)/Vp = \sin(90°)/Vsaw$ or $\cos(\theta) = Vp/Vsaw$, where $Vp$ is the pressure wave phase velocity in the wedge material and $Vsaw$ is the surface acoustic wave phase velocity, may be used to determine the angle at which the pressure waves are propagating within the mode conversion wedge 156. The angle $\theta$ is the angle between the SAW propagation direction and the direction of the pressure wave it couples to within the mode conversion wedge 156. That angle may then be used to determine the angle or slope of the stepped faces 158 based on the reflection law. The side view of FIG. 6A also depicts the wedge-shaped nature of each stepped face 158.

The stepped transducers may also include a stepped interface with the substrate. For example, the bottom profile of the stepped transducer may have a footprint touching the substrate with stepped features. One example of a stepped footprint is shown in FIG. 6B, in which a bottom 169' of a mode conversion wedge 156' has a number of undercuts U1-U3 along a front face 162' along which a piezoelectric element 160' is disposed. Each undercut U1-U3 forms a respective step. Stepped features on the bottom 169' may be included for incoming and/or outgoing waves, e.g., away from and facing the incoming SAW.

The stepped interface with the substrate may be useful in reducing undesired surface acoustic wave attenuation at the substrate-wedge interface due to emission of bulk waves within the mode conversion wedge 156 that do not reach the piezoelectric element as desired. The attenuation may arise from reflections of the bulk pressure waves within the mode conversion wedge 156 other than the reflection off of the reflector steps. The bulk pressure waves may reflect off the top of the mode conversion wedge, as described below in connection with the example of FIG. 7 and illustrated in FIG. 11. In other embodiments (e.g., those not having undercuts), various signal processing techniques may to some degree compensate for, or otherwise address, the attenuation of the acoustic energy in the mode conversion wedge.

Figure 7:
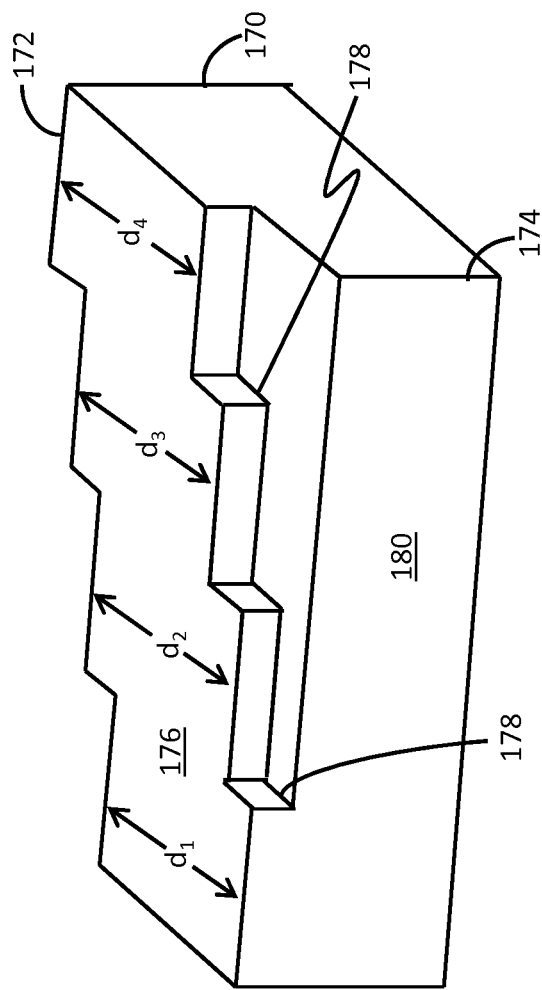
FIG. 7 is a bottom, perspective view of a mode conversion wedge having multiple stepped interfaces in accordance with one embodiment.

FIG. 7 depicts another example of a mode conversion wedge 170 having an undercut, stepped interface with the substrate. As described below, after the undercut, the remaining substrate-wedge interface converts the SAW signals into bulk waves and directs the bulk waves in the wedge 170 to the reflector steps. The mode conversion wedge 170 may be configured for use in a single-piezoelectric element embodiment.

The mode conversion wedge 170 includes a stepped back or rear face 172 to equalize the arrival times as described above. A piezoelectric element (not shown) is disposed at a front face 174 of the mode conversion wedge 170 opposite of the rear face 172. The piezoelectric element may be spaced from a bottom 176 of the mode conversion wedge 170 to avoid affecting the incoming SAW waves as the SAW waves travel in the substrate (not shown) toward the front face 174. The mode conversion wedge 170 is depicted in FIG. 7 with the bottom 176 facing upward to show how the bottom 176 is undercut in a set of undercut steps 178. The bottom 176 interfaces with the substrate in both normal and zero-bezel embodiments.

The set of undercut steps 178 match the reflector steps along the rear face 172. Such matching of the opposing stepped interfaces equalizes distances $d_1$, $d_2$, $d_3$, and $d_4$ over which SAW waves couple to bulk waves in the wedge 170. The length of each distance $d_1$-$d_4$ may be selected such that the bulk waves, which may propagate at an angle upon entering the wedge 170, travel the same distance before impacting the back face 172. For instance, the distance may be selected such that the bulk waves avoid reflecting off the top of the wedge 170 before impacting the back face 172. The overall travel distance in the wedge 170 (i.e., including travel after reflection off the back face 172) may then be controlled as a function of the distance between the step along the back face and a flat front 180 of the front face 174 along which the piezoelectric element is disposed. The overall travel distance varies to equalize the arrival times at the piezoelectric element as described above.

In one embodiment, the spacing between adjacent steps varies from the equal spacing arrangement described above in connection with the example of FIG. 3B (e.g., where, for a SAW wave which has a span equal to 16 wavelengths, each discrete transducer step introduces an equal delay of 4 wavelengths). For example, the impact front of each sub-wedge, or step, to the back reflector surface may be determined by the height of the piezoelectric element 160 bonded on the face 162. The piezoelectric element height, the offset of the piezoelectric element from the glass surface, the glass SAW speed, and the acrylic bulk wave speed may be factors in determining the spacing arrangement, as well as an undercut spacing arrangement (e.g., see FIG. 7 and equal lengths d1-d4). In some embodiments, the undercut spacing arrangement described in connection with FIG. 7 may match the step spacing of the back reflector. During the overall travel distance, without the undercut spacing arrangement, some of the energy will be traveling at SAW/glass speed while other energy is traveling at acrylic/bulk speed. The spacing between adjacent steps may be compressed from the equal spacing arrangement to account for the difference, and thereby compensate for the varying distances the acoustic energy travels in the mode conversion wedge 156 after impacting the respective step.

The stepped transducers need not be disposed in the same corner of the substrate 164. In other embodiments, the stepped wedge or other stepped transducers for the X and Y axes are disposed in different corners. In yet another embodiment, a single stepped transducer may be used to receive signals for both X and Y axes. The piezoelectric elements are mounted or disposed on both flat faces of the mode conversion wedge, which is then oriented with the piezoelectric elements closest to the frit or reflector arrays so that the steps introduce the delays that result in mitigation of the dispersion.

The stepped transducers of the embodiment of FIG. 4 may be used with other touch input systems, and are not limited to bezel-free touchscreens. The stepped transducers may be mounted or disposed on a front side of a substrate of the touch input system, which may also be used in a device with a bezel configured to cover the stepped transducers.

The transducer arrangements are not limited to those having transducers disposed in a corner of a touchscreen or other touch input system substrate. For example, one or more transducers may be disposed along a side of a substrate.

Using stepped transducers to reduce the spreading or dispersion of the incoming acoustic energy may increase the resolution of touch input systems.

Stepped transducer geometry is depicted in FIGS. 8-11. In the plan view of FIG. 8, let "a" be the center-to-center vertical offset between top and bottom steps and "b" be the horizontal offset between top and bottom steps. Relative to the piezoelectric element, the steps form an angle "ϕ" with respect to the vertical, such that $\tan(\phi)=\Delta/s=b/a$. To minimize time spreading effects, the propagation delay time associated with SAW acoustic path segment 1, namely $a/V_{SAW}$, equals the sum of delays associated with SAW acoustic path segment 2 and horizontally propagating pressure wave acoustic path segment 3, namely $(b/V_{SAW}+b/V_P)$. Thus the following condition applies $$a/V_{SAW}=(b/V_{SAW}+b/V_P)$$

which leads to the following:

$$\tan(\phi)=\Delta/s=b/a=1/(1+V_{SAW}/V_P)$$

Wedge operation involves surface acoustic waves on the glass refracting into a pressure wave in the wedge material per Snell's law. Such refraction occurs if $V_{SAW}$ is larger than $V_P$ and hence $V_{SAW}/V_P$ is larger than one. With the assumptions that the surface acoustic waves from point A are scattered at a right angle by 45° reflectors, this results in the following inequality:

$$\tan(\phi)=b/a=1/(1+V_{SAW}/V_P)<\frac{1}{2} \text{ or } \phi<27°$$

The inequality $b/a<\frac{1}{2}$ is physically reasonable for two reasons. Distance b involves a round trip while distance a is only one way. By itself this effect implies that b is half of a. Furthermore the delay from acoustic segment 3 is due to a pressure wave with a slower velocity than SAW which further reduces b relative to a.

Applying the foregoing to example values of $V_{SAW}=3160$ m/s and $V_P=2680$ m/s, $V_{SAW}/V_P=3160/2680=1.179$, $\tan(\phi)=0.459$ and $\phi=24.65°$.

Figure 8:
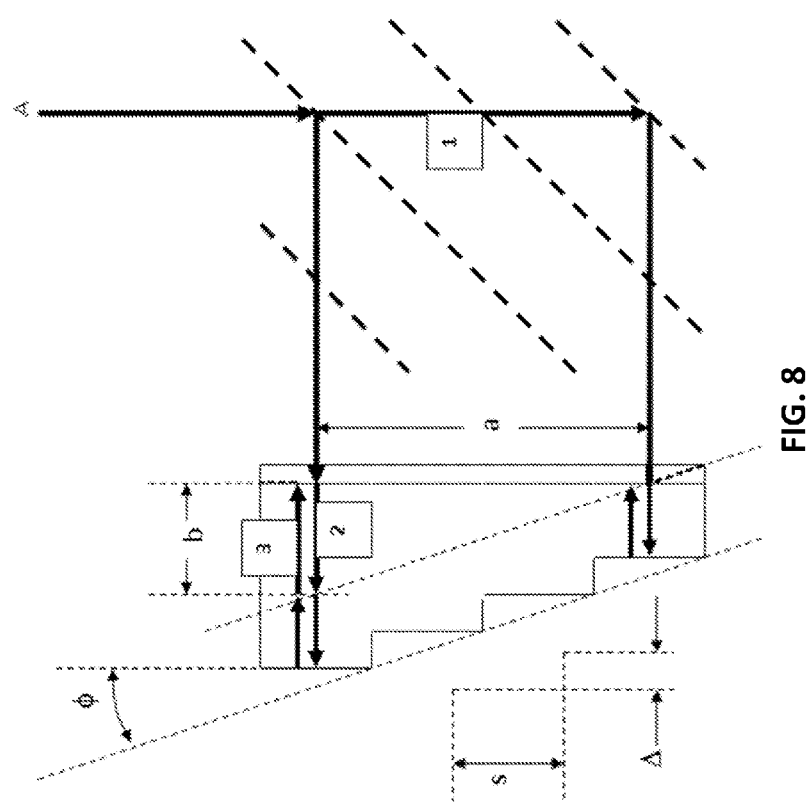
FIGS. 8 and 9 are top view, schematic diagrams of a stepped wedge transducer in accordance with one embodiment.

In the embodiment shown in FIG. 8, the direction of all the arrows may be reversed with no effect, except that transducer transmission rather than reception is implemented. The quantitative analysis above applies equally to transmit and receive operation of a stepped wedge transducer.

The stepped interface of the disclosed embodiments may be used to reduce time spreading without necessarily minimizing such spreading. In such cases, an angle φ differing from arctan $\{1/(1+V_{SAW}/V_P)\}$ may be selected. For example, if the stepped wedge transducer is constructed of the acrylic material referenced herein, attenuation of pressure waves in the wedge material may be non-negligible. In such cases, it may desirable to reduce pressure wave path lengths by choosing a value of the angle φ smaller than arctan $\{1/(1+V_{SAW}/V_P)\}$. For a general value of the angle φ, the difference in propagation time for the two paths illustrated above is δt given by the below equation.

$$\delta t = \{a/V_{SAW}\} \cdot \{1-\tan(\phi) \cdot (1+V_{SAW}/V_P)\}$$

For φ=0, δt equals $\{a/V_{SAW}\}$ which is also the case for a typical transducer. For φ=arctan $\{1/(1+V_{SAW}/V_P)\}$, δt equals 0. The inequality below gives the range of φ for which stepped transducer time spreading is less than that for a standard wedge transducer. With the exemplary values of $V_{SAW}$ and $V_P$ noted above, the range 0<φ<42.5° for time spreading is reduced relative to a conventional wedge transducer. The absolute value of δt is less than $\{a/V_{SAW}\}$ if φ is within the following limits:

$$0<\phi<\arctan\{2/(1+V_{SAW}/V_P)\}$$

Figure 9:
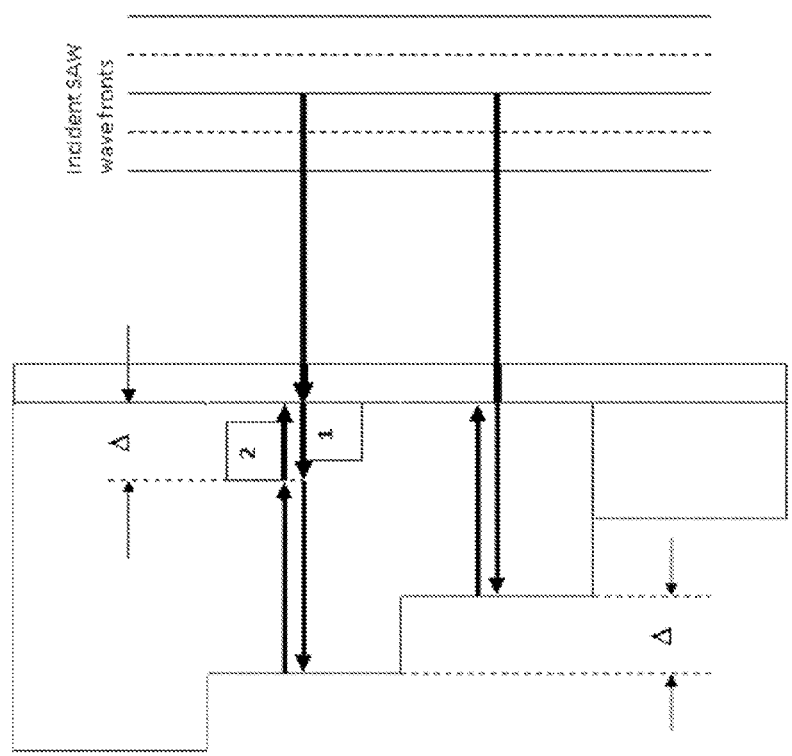

The step depth Δ shown in FIG. 8 may be selected for phase coherence between wave fronts reaching the piezoelectric element from different steps. For example, as shown in FIG. 9, the extra time delay may be constrained to be an integer number n of periods T of the operating frequency f=1/T as given by the equation below. The first term on the left corresponds to the time delay of SAW acoustic path segment 1 and the second term to the time delay of pressure wave path segment 2.

$$\Delta/V_{SAW}+\Delta/V_P=n \cdot T$$

Given that the SAW wavelength $\lambda_{SAW}$ is equal to the period T times the SAW velocity $V_{SAW}$, the above step depth condition may be rewritten as follows.

$$\Delta=n \cdot \lambda_{SAW}/(1+V_{SAW}/V_P)$$

If the angle φ is chosen to minimize time spreading with $\tan(\phi)=\Delta/s=1/(1+V_{SAW}/V_P)$, the coherence condition simplifies as follows with the step width equal to an integer number of SAW wavelengths.

$$s=n \cdot \lambda_{SAW}$$

Figure 10:
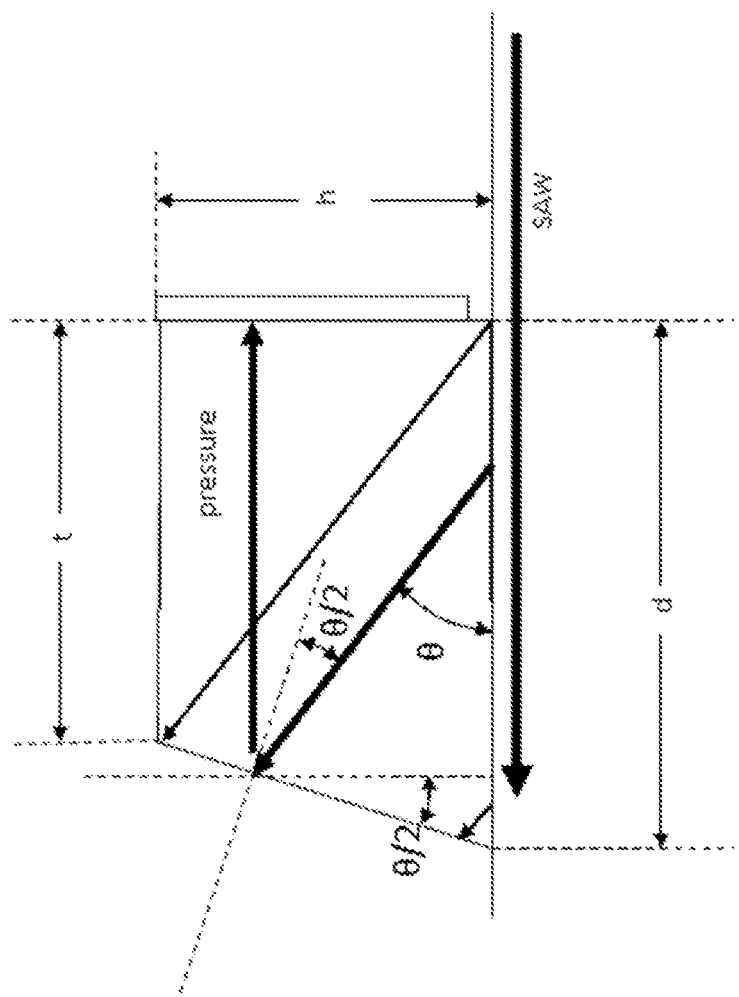
FIGS. 10 and 11 are side view, schematic diagrams of a stepped wedge transducer in accordance with alternative embodiments.

FIG. 10 illustrates a cross section of the shortest step. The incident surface acoustic wave refracts and mode converts into a pressure wave at an angle θ. By Snell's Law, this angle is given by the following formula.

$$\cos(\theta)=V_P/V_{SAW}$$

In one example, with values of $V_{SAW}$=3160 m/s and $V_P$=2680 m/s, the numerical values cos(θ)=2680/3160=0.848, and hence θ=32°.

If h is the height of the stepped wedge and t is the top surface length of the shortest step, the distance t may be selected so that the first pressure wave refracting from the incident SAW reaches height h at distance t so that tan(θ)=h/t. The above formula may be written as cos(θ)=$V_P/V_{SAW}$, such that t is determined (within the ray tracing approximation) by h and the ratio of acoustic wave velocities as follows.

$$t=h/\tan(\theta)=h/\sqrt{\{(V_{SAW}/V_P)^2-1\}}$$

In this example, the step face opposite the piezoelectric element is sloped so that the pressure wave is reflected into a horizontal direction toward the piezoelectric element. The principle (when there is no mode conversion) that the angle of incidence equals the angle of reflection may be used to determine the angle of the reflective step face at θ/2 with respect to vertical. The distance "d" is longer than t by an amount (d−t)=h·tan(θ/2). Based on the above expression for t, the following expression is applicable:

$$d=t+h \cdot \tan(\theta/2)=h \cdot [1/\sqrt{\{(V_{SAW}/V_P)^2-1\}}+\sqrt{\{(1-V_P/V_{SAW})/(1+V_P/V_{SAW})\}}]$$

For example values of $V_{SAW}$=3160 m/s and $V_P$=2680 m/s, θ/2 is 16°, t/h is 1.601 and d/h is 1.887. If, for example, h is selected to be 2.5 mm (so if the piezoelectric element height is 2 mm, there is 0.5 mm tolerance to keep the piezoelectric element and any associated glue clear of the glass surface), then t=4.00 mm and d=4.72 mm.

Figure 11:
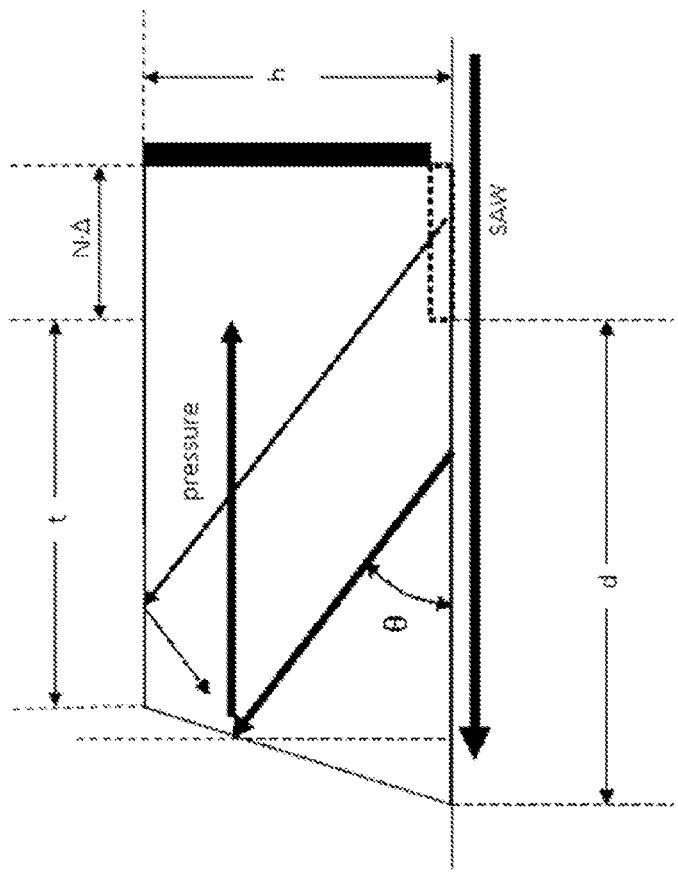

The schematic illustration of FIG. 11 is similar to the illustration of FIG. 10. It is a cross section for a step that is not the shortest step. The distance between the reflector face N and the piezoelectric element is increased by an amount N·Δ, where N=0 for the shortest step and N increments by one for each successively longer step.

The dotted rectangle in FIG. 11 represents an exemplary undercut. The undercut may eliminate inefficiency from refracted pressure waves that do not reach the reflector face opposite the piezoelectric element.

In embodiments with an undercut, N·Δ is one choice for the depth if bulk wave attenuation in the wedge material may be neglected and a ray tracing analysis provides an good approximation of wave propagation. If bulk wave attenuation is significant, experience with existing commercial SAW touchscreen wedge transducers suggests that the optimal depth may be more than N·Δ. Given that a typical SAW wavelength in glass (at 5.53 MHz) is about $\lambda_{SAW}$=0.6 mm, and dimensions h, Δ, t and d are not that much larger, we can only expect ray tracing analyses to be a rough approximation. In the end, experiments in the lab or via simulation are needed to optimize stepped wedge transducer designs. Nevertheless, ray tracing arguments are generally sufficient to understand key design concepts, if not to fully optimize designs.

In the above-described stepped wedge transducer design, the pressure waves travel a longer distance between the glass and piezoelectric element in the wedge material (relative to conventional wedge designs). The increase in distance may be approximately a factor of two. The stepped wedge transducers described herein may accordingly use wedge materials with low pressure wave attenuation rates. For example, the polyimide material SX-100 of SUZUKO provides a lower attenuation rate than acrylic typically used in conventional wedge transducers.

Consideration of far field effects may be useful in connection with the configuration of the above-described stepped wedge transducers. In some cases, the stepped wedge transducer may improve (e.g., reduce) time spreading of touch signals. Stepped wedge transducers provide such improvement if the reflectors are in the near field of the transducer. Such improvements may not be present if the reflectors are in the far field of the transducer.

In the far field, each point on a reflector is, to a good approximation, equally illuminated by all steps of the stepped wedge transducer. In the far field, all acoustic paths from locations on the transducer to locations on the array are considered. In the far field, the time difference between certain acoustic paths (e.g., non-parallel paths) is greater than the spread of time differences that occurs with a conventional wedge transducer.

One estimate for a distance marking the line between the near and far field regions is L=$W^2/\lambda$, where W is the transducer width. In the near field the transducer beam equals the transducer width W. In the far field the angular emission pattern for an aperture of width W of a wave of wavelength λ, has zeros or nodes at angles ±Φ=λ/W. This condition may be used to arrive at the aforementioned distance. For a transducer that is 16 wavelengths wide, L=256λ. For a wavelength of about 0.6 mm, L is about 153.6 mm, or 6 inches. Some other common estimates for the near-field/far-field transition distance are more conservative (shorter), suggesting smaller values of L are used to most fully benefit from the dispersion mitigating benefits of stepped transducers.

In some embodiments, a touch input system may include transmit and receive transducers in each corner for a total of eight transducers. Such arrangements cut the reflector array lengths in half, which may be used to fit entire arrays in the near field of the transducer. Examples of eight transducer arrangements are described in U.S. Pat. No. 5,854,450, the entire disclosure of which is incorporated by reference. The shorter path lengths involved in such arrangements may also allow the frequency to be increased, for example, by a factor of 1.5. A factor of 1.5 increase in frequency results in a factor of 1.5 decrease in wavelength λ and hence a factor of 1.5 increase in the near field region length estimate $L=W^2/\lambda$, thus increasing the distance covered by the near field increases accordingly.

Figure 12:
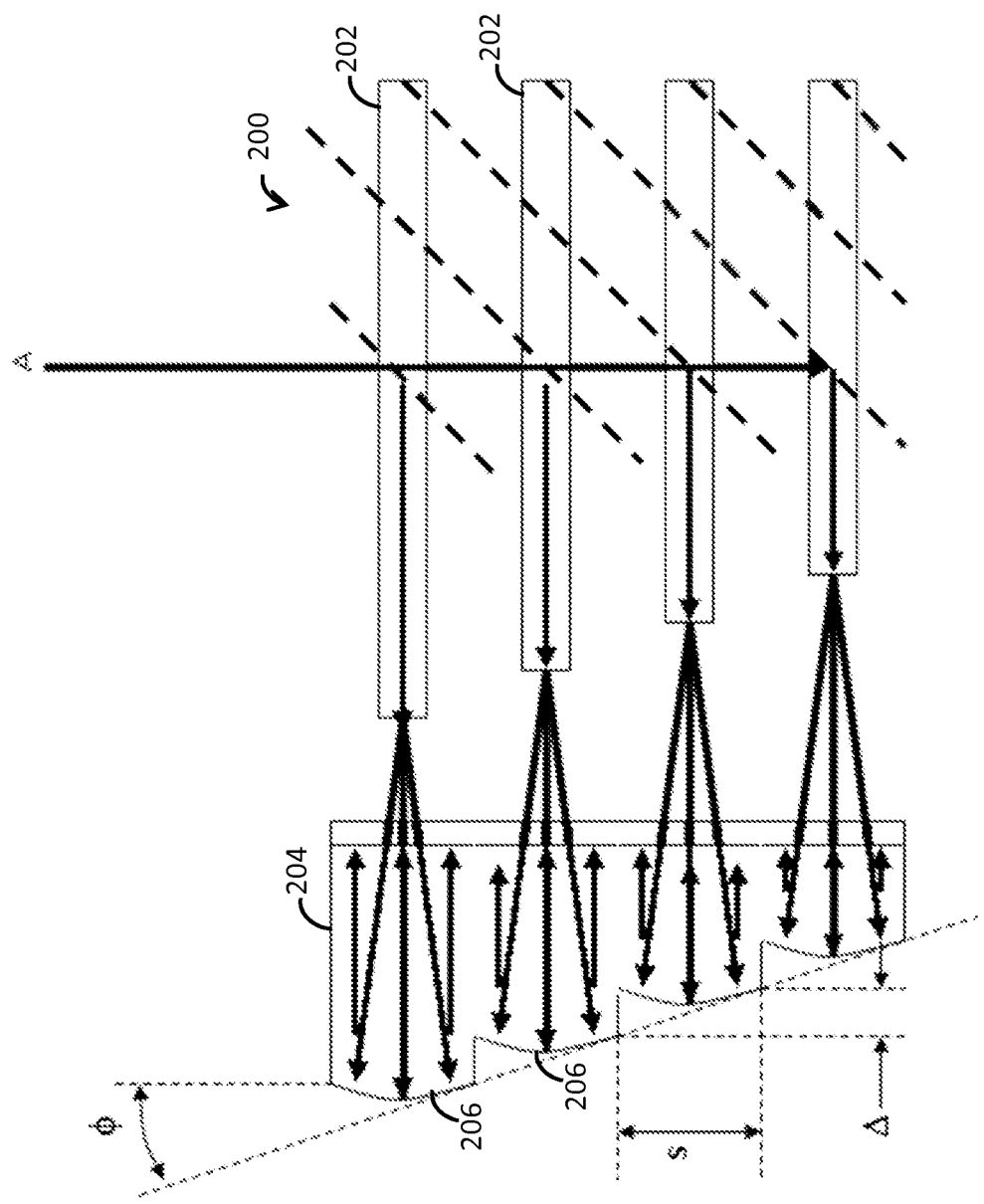
FIG. 12 is a partial, top, schematic view of a touch input system having a reflector array with a set of waveguides in accordance with one embodiment.

FIG. 12 depicts another embodiment of the disclosed touch input systems. In this embodiment, the signal dispersion reducing advantages of the above-described stepped wedge transducers are applied in connection with a reflective array 200 having a set of acoustic waveguides 202. The SAW phase velocity is reduced in a core of each acoustic waveguide 202. In some embodiments, the waveguides 202 may be formed by depositing a coating of dense material on the substrate surface. For example, the same material and process steps used to make the reflectors of the reflector array 200 may be applied. The guiding effects of the respective core of each waveguide 202 support the more direct or parallel acoustic paths. Energy attempting to propagate on non-parallel paths may be deflected to follow the waveguide core and, thus, a more direct and parallel path. Eliminating less direct or parallel acoustic paths that cause undesired signal dispersion in the far field allows the stepped wedge transducer arrangement to provide the above-described advantages in embodiments that would otherwise present far field effects.

In the embodiment of FIG. 12, there is potential for undesired transfer of energy between the different waveguide cores 202. If a pair of waveguide cores 202 are sufficiently close, there is a weak coupling between their respective waveguide modes, creating an example of the classical problem of weakly coupled identical oscillators. The result is that with a sufficiently long propagation distance, acoustic energy guided by on one acoustic wave guide core eventually transfers to a neighboring waveguide core. The design of the waveguide cores 202 of FIG. 12 may ensure that this energy transfer distance is long compared to the length of the arrays and hence may be neglected. For example, consider a variant of the design of FIG. 12 with a glass substrate, and operating frequency of 5.53 MHz, a stepped wedge transducer with two steps and a width of 16 SAW wavelengths (about 9 mm) and two matching waveguide cores with center-to-center spacing of 8 SAW wavelengths (about 4.5 mm). Furthermore consider waveguide cores 202 formed of deposited (e.g. screen printed) glass frit with a width of half a SAW wavelength (about 0.3 mm). Furthermore, consider that the thickness of the deposited glass frit is sufficient to depress the SAW velocity by 2% (as is typical of glass frit printed to form reflector arrays). From this information it may be calculated that the distance for acoustic energy to transfer from one waveguide core 202 to the neighboring core is about 750 mm. This is longer than many arrays in commercial SAW touchscreen designs. This oscillation distance may be extended by reducing the strength of the weak coupling between the neighboring waveguides either by increasing the waveguide core separations or by increasing the width and/or thickness of the waveguide core material.

The example of FIG. 12 depicts a stepped wedge transducer 204 in a receive mode context involving a touch in position A. Operation in a transmit mode context may be depicted by reversing the direction of the arrows representative of the acoustic paths.

The stepped wedge transducer 204 may include focusing reflective surfaces 206 to improve coupling of the SAW energy into the acoustic waveguides 202. Each reflective surface 206 is curved as shown to focus the SAW energy.

The focusing aspect of the transducer 204 may be applied to grating transducers. For example, the straight line segment gratings described above may be replaced with gratings that include curved portions, e.g., arcs of circles centered at the inlet of the core of the waveguide 202.

While the invention has been described above by reference to various embodiments, it should be understood that many changes and modifications can be made without departing from the scope of the invention. For example, a higher number of steps may be used in the stepped transducer design to mitigate the dispersion caused by the angled reflective arrays. It is therefore intended that the foregoing detailed description be regarded as illustrative rather than limiting, and that it be understood that it is the following claims, including all equivalents, that are intended to define the spirit and scope of this invention.

What is claimed:

1. A touch input system comprising:
  a substrate configured to support propagation of acoustic signals;
  a transducer in communication with the substrate and configured to transmit or receive the acoustic signals before or after the propagation; and
  an array of reflectors disposed on the substrate, each reflector being oriented on an angle to redirect the acoustic signals along a path toward or away from the transducer;
  wherein the transducer comprises a stepped interface for the redirected acoustic signals, the stepped interface comprising a set of interface elements distributed across a width of the acoustic signals and offset from one another along the path to compensate for the angle of the reflectors.

2. The touch input system of claim 1, wherein the transducer comprises a plurality of piezoelectric elements distributed across the width of the acoustic signals and offset from one another along the path to equalize an arrival time of a respective portion of the redirected acoustic signals captured by the corresponding piezoelectric element.

3. The touch input system of claim 1, wherein the transducer comprises a mode conversion wedge, the mode conversion wedge comprising a stepped first face and a piezoelectric element disposed at a second face of the mode conversion wedge opposite of the first face.

4. The touch input system of claim 3, wherein the stepped first face comprises a plurality of reflector steps, and wherein each reflector step comprises a curved surface.

5. The touch input system of claim 3, wherein the transducer is oriented relative to the array of reflectors to position the stepped first face and the second face such that the acoustic signals travel past the second face before reflection off the stepped first face in the mode conversion wedge.

6. The touch input system of claim 3, wherein the piezoelectric element may be spaced from a bottom of the mode conversion wedge to avoid affecting the redirected acoustic waves before the reflection off the stepped first face in the mode conversion wedge.

7. The touch input system of claim 3, wherein the stepped first face includes a plurality of reflector steps.

8. The touch input system of claim 7, wherein:
the mode conversion wedge comprises an acrylic block having the stepped first face, and
adjacent reflector steps of the plurality of reflector steps are spaced from one another based on a bulk wave speed in the acrylic block.

9. The touch input system of claim 3, wherein the mode conversion wedge further comprises an undercut bottom in communication with the substrate, the undercut bottom comprising a set of undercut steps that match the stepped first face.

10. The touch input system of claim 9, wherein:
the stepped first face includes a plurality of reflector steps, and
adjacent reflector steps of the plurality of reflector steps and adjacent undercut steps of the set of undercut steps are spaced from one another to equalize an arrival time of respective portions of the acoustic signals at the piezoelectric element of the transducer.

11. The touch input system of claim 1, wherein the stepped interface comprises a set of grates to form a grating transducer.

12. The touch input system of claim 11, wherein each grate is curved.

13. The touch input system of claim 1, wherein the array of reflectors comprises a plurality of waveguides.

14. The touch input system of claim 1, wherein the acoustic signals are surface acoustic wave (SAW) signals.

15. A transducer for a touch input system comprising:
a mode conversion wedge comprising a first face and a second face opposite the first face, the mode conversion wedge being configured to convert surface acoustic wave (SAW) signals to bulk pressure waves; and
a piezoelectric element disposed at the second face of the mode conversion wedge opposite of the first face to transmit or receive a reflection of the bulk pressure waves off the second face;
wherein the first face includes a plurality of reflector steps offset from one another to compensate for dispersion of the SAW signals.

16. The transducer of claim 15, wherein the mode conversion wedge has a bottom between the first and second faces, and wherein the piezoelectric element is spaced from the bottom of the mode conversion wedge to allow the SAW signals to travel past the first face before the reflection of the bulk pressure waves off the second face.

17. The transducer of claim 16, wherein the bottom of the mode conversion wedge comprises a set of undercut steps that match the plurality of reflector steps.

18. The transducer of claim 15, wherein the mode conversion wedge comprises an acrylic block.

19. The transducer of claim 15, wherein each reflector steps comprises a curved surface.

20. The transducer of claim 15, in combination with a reflector array comprising a plurality of waveguides.

* * * * *